United States Patent [19]
Weber

[11] 3,936,823
[45] Feb. 3, 1976

[54] FAST SEARCH AND LOCK-ON MEANS FOR DISTANCE MEASURING EQUIPMENT

[75] Inventor: Charles A. Weber, Marion, Iowa

[73] Assignee: Rockwell International Corporation, El Segundo, Calif.

[22] Filed: Aug. 1, 1974

[21] Appl. No.: 494,262

[52] U.S. Cl. .............................................. 343/7.3
[51] Int. Cl.² ........................ G01S 9/14; G01S 9/56
[58] Field of Search .................................. 343/7.3

[56] References Cited
UNITED STATES PATENTS

| | | | |
|---|---|---|---|
| 3,092,831 | 6/1963 | Mercer | 343/7.3 |
| 3,267,464 | 8/1966 | Shames | 343/7.3 |
| 3,456,257 | 7/1969 | Aker | 343/7.3 |
| 3,702,475 | 11/1972 | Alden et al. | 343/7.3 |
| 3,781,885 | 12/1973 | Hassencahl | 343/7.3 |
| 3,787,846 | 1/1974 | Bishop | 343/7.3 |

*Primary Examiner*—T. H. Tubbesing
*Attorney, Agent, or Firm*—Richard W. Anderson; Robert J. Crawford

[57] ABSTRACT

A fast search system for DME generates range gates at the time an analog sweep voltage rises to the magnitude of an analog integrator waveform, the latter having a slope less than that of the sweep voltage and provided with a constant current source input. The current source is selectively inhibited by digital control means responsive to the relative time occurrence of range gates and reply pulses such that the range gate occurs during an instant interrogation period at a point in time corresponding to a predetermined percentage of the time at which appeared the first received reply pulse in a preceding interrogation period.

10 Claims, 5 Drawing Figures

FAST SEARCH AND LOCK-ON MEANS FOR DISTANCE MEASURING EQUIPMENT

This invention relates generally to distance measuring equipment (DME) and more particulary to an improved hybrid (combination analog and digital) fast search and lock-on circuitry for DME.

The DME implemented in civil service and military service consists of an airborne interrogator that transmits a series of essentially periodic pulses to a ground station and receives reply pulses with a time delay proportional to slant distance between the interrogation source and the ground station. In general, DME equipment generate, at the interrogator, a range gate which is caused initially to search out in time from interrogation pulse transmission and replies are checked for time coincidence with the gate. When replies from an interrogated ground station are time synchronous with the range gate, the time position of the range gate with respect to the interrogation pulse is an analog of the distance between the interrogator and the ground station.

Because a reply to any one interrogation is received along with reply pulses from other interrogation sources as well, and the received signal characteristically comprises additional random squitter pulses, each interrogator must search out and identify those reply pulses which are generated in response to its particular interrogation. Thus, the DME system requires each interrogator to identify its particular reply pulse for distance determination, and to ignore non-synchronous or random pulses.

Conventional search methods have provided means for moving the range gate slowly outward on successive interrogations from zero miles to the maximum range of the particular system. The gate has been made sufficiently wide and moved slowly enough so that there would be time for any true reply to fall within the range gate a plurality of times on successive interrogations. This search method involves considerable search time (sometimes ranging up to 30 seconds) for true reply acquisition and identity.

Subsequent improvements in DME search techniques provided a "fast search", whereby the range gate was caused to rapidly move in discreet steps during succeeding interrogation cycles, with the range gate being generated in any particular interrogation cycle at a position corresponding to that of the first received reply pulse in the preceding interrogation cycle. That is, if the first reply received during any given interrogation cycle occurred at a time corresponding to one-half the maximum range of the DME, the range gate was generated during the next succeeding interrogation cycle at a time immediately preceding this half-range position, and the first half of the range was ignored. Thus, the range gate was always next generated where a reply pulse was likely to occur and a substantial reduction in search for an acquisition of synchronous reply pulses was realized by eliminating the time spent in the earlier continuous search methods in looking systematically through segments of the range during which replies could not logically be expected to occur. Search times were reduced significantly to be, for example, 1/100 of the search time required in previous systems.

Known means of accomplishing fast-search have involved digital techniques. Reference is made to Pat. No. 3,267,464 to Oscar Shames, Pat. No. 3,456,257 to J. L. Aker, Pat. No. 3,680,097 to Dean T. Huntsinger, and the article entitled "A Method of High Speed Search for DME and TACAN" by Oscar Shames, IEEE Transactions on Aerospace and Navigation Electronics, March 1965, page 76. These references disclose digital techniques by means of which the aforedefined fast search technique has been implemented in the art.

The object of the present invention is the provision of a novel hybrid means to accomplish a DME fast search technique which provides advantages of the referenced digital means at considerably less implementation costs.

The present invention is featured in the provision of conventional analog sweep voltage generation along with voltage comparison of the output therefrom with the output from an anlog integrator. The integrator is provided with a selective inhibit function controlled by logic responsive to the relative timing between interrogation sync, reply, and range gate pulses. When enabled, the integrator provides an output increasing at a lessor slope than that of the sweep generator waveform. Voltage comparison between the sweep and integrator outputs generates a range gate during any given interrogation cycle at a time corresponding to a predetermined percentage of the distance analog represented by the position of the first received reply pulse during a previous interrogation.

These and other features and objects of the present invention will become apparent upon reading the following description with reference to the accompanying drawings in which.

As above described, the present invention relates to a means for effecting a rapid search and lock-on in a DME equipment. The function of the circuitry, as in known digital circuitries accomplishing fast lock-on, is that of rapidly searching out and identifying reply pulses from a DME interrogator. The basic principle employed is like that of known digital circuitries for accomplishing fast lock-on in that a range gate is caused to be generated during the DME search operational mode only where a reply is logically expected to be. In contradistinction to conventional DME search techniques, the present invention causes a range gate to move out in discrete steps, and to be generated during a given interrogation cycle at that point in the system timing frame where a reply was first received during a next preceding interrogation cycle. The system, thus, ignores the portion of the timing frame from the instant of the interrogation pulse to where the first received pulse may be expected, with result that the time to acquire a lock-on with the interrogator reply pulse is but a fraction of that required by conventional slewing range gate techniques.

The fast search lock-on circuitry to be described incorporates a seach mode which is initiated prior to making any actual distance measurements. In the search mode, the range gate systematically occupies all the possible time, following each successive interrogation, in which a distance reply could occur. When the range gate is time coincident with the correctly identified distance reply pulse, the search mode is terminated. In order to correctly identify the reply pulse and ignore other interfering pulses, coincidence of the reply pulse with the range gate is examined over several interrogation periods to test for time synchronization with the interrogation. As in known DME systems, a criterion is set up in the lock-on circuitry which must be met before actual lock-on (completion of search and changeover to track mode) is accomplished.

Figure 1:
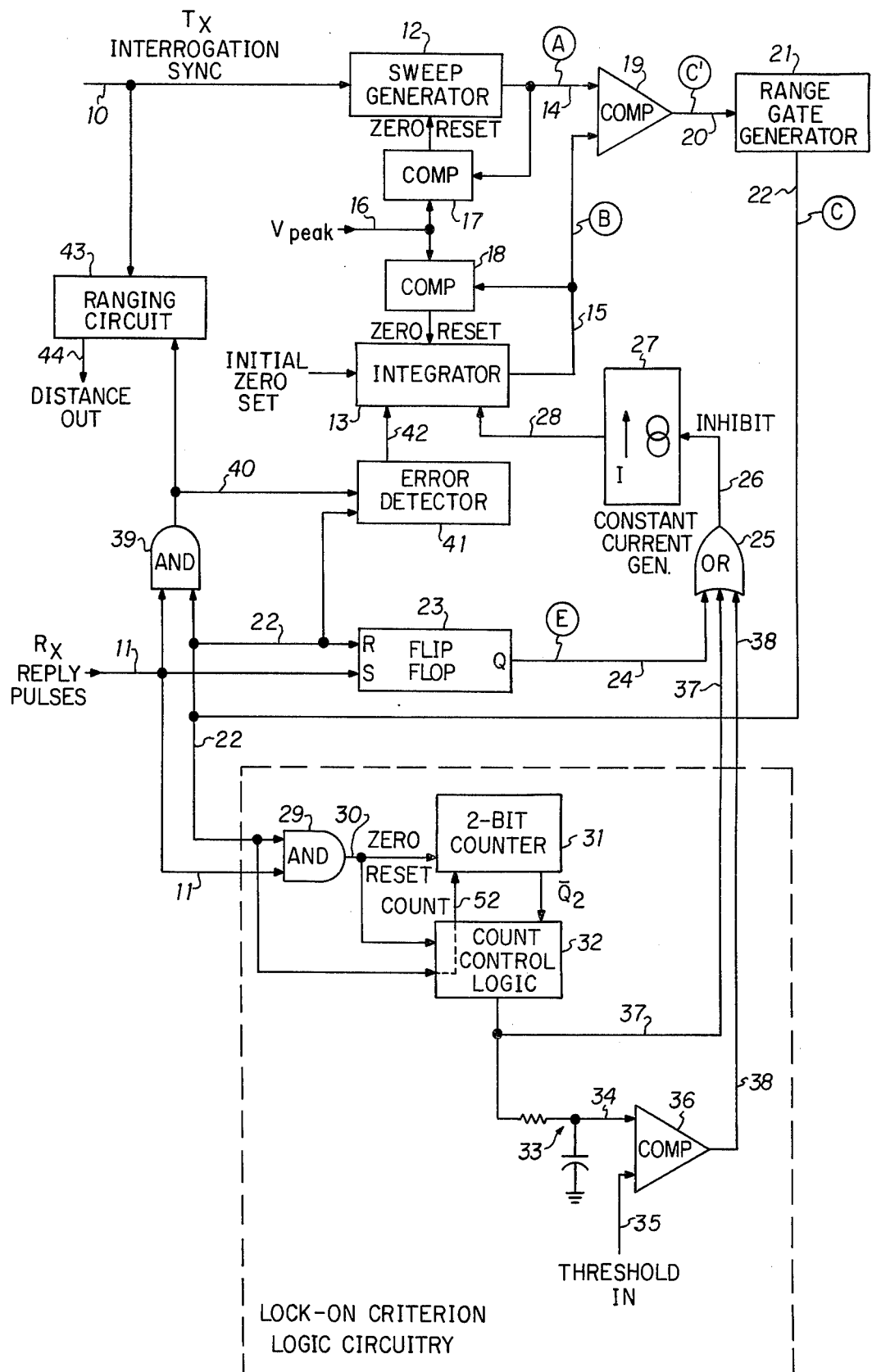
FIG. 1 is a functional block diagram of a DME fast search and lock-on circuitry in accordance with the present invention.

With reference to FIG. 1, only those portions of a DME interrogator related to the concept of the present invention are depicted. Inputs to the system are depicted as interrogation sync, $T_x$, and receiver reply pulses, $R_x$. Since development of interrogation sync pulses and the reception of reply pulses are known expedients in the DME art, the circuitries from which these inputs emanate are not depicted.

Interrogation sync pulses 10 are applied to a sweep generator 12. A selectively inhibited integrator 13 generates a reference output 15 which is compared with that of the sweep generator in voltage comparator 19.

Comparator 19 develops an output when the sweep output 14 exceeds the output of 15 from integrator 13. In response to the output 20 from comparator 19, range gate generator 21 develops a narrow range gate 22 of preselected width. The range gate 22 and reply pulses 11 are applied as respective reset and set inputs to an R-S flip-flop 23. The output 24 from flip-flop 23 is applied through an OR gate 25 as an inhibiting control 26 to a constant current generator 27. The output 28 of generator 27 is applied to integrator 13.

Further inputs 37 or 38 to OR gate 25 are developed in a lock-on criterion logic circuitry, the basic purpose of which is to identify those received pulses which are time synchronous with the range gate 22 as being either true or random pulses. For this purpose, the lock-on criterion logic circuitry receives reply pulses 11 and range gates 22 as respective inputs and, as will be further described, in response to the time relationship between these inputs during successive interrogation periods, develops output control logic on lines 37 or 38 to selectively provide inhibiting functions to the constant current generator 27.

Both the sweep generator 12 and the integrator 13 are provided with peak voltage reset. The output of 14 of sweep generator 12 is applied to a comparator 17 along with a peak voltage reference 16 to provide zero reset to the sweep generator when the sweep output 14 rises to the peak reference which, for the purpose of the present invention, corresponds on a voltage-time analog basis to something greater than the maximum range for which the system is designed. Likewise, integrator 13 is provided with zero reset by means of comparator 18 which compares the output of integrator 13 with the peak voltage reference 16 to provide a zero reset to the integrator 13 should the integrator output rise to the peak reference.

Also illustrated in FIG. 1, although not particularly pertinent to the present invention, are provisions for applying range-gate time synchronous received pulses 11 to a ranging circuit 43 along with interrogation sync pulses 10, whereby the ranging circuit 43 may develop from the time relationship therebetween an output 44 related to the distance between the interrogator and the ground transponder. An AND gate 39 is illustrated as receiving the receive pulses 11 and the output 22 of range gate generator 21 and passes range gate synchronous received pulses 11 as input 40 to ranging circuit 43. An error detector 41 is additionally depicted as receiving the range gate synchronous reply pulses on line 40, and the output from the range gate generator 22. Error detector 41 might comprise known circuitries to slew the output of integrator 13 in accordance with the discrepancy between the time of occurrence of the received reply pulses and the range gate center upon lock-on being effected in the system (track mode). This technique is utilized in DME systems to slew the position of the range gate to maintain time synchronism with true reply pulses in accordance with the changing distance (increasing or decreasing) between the interrogator and the ground transponder.

Figure 2:
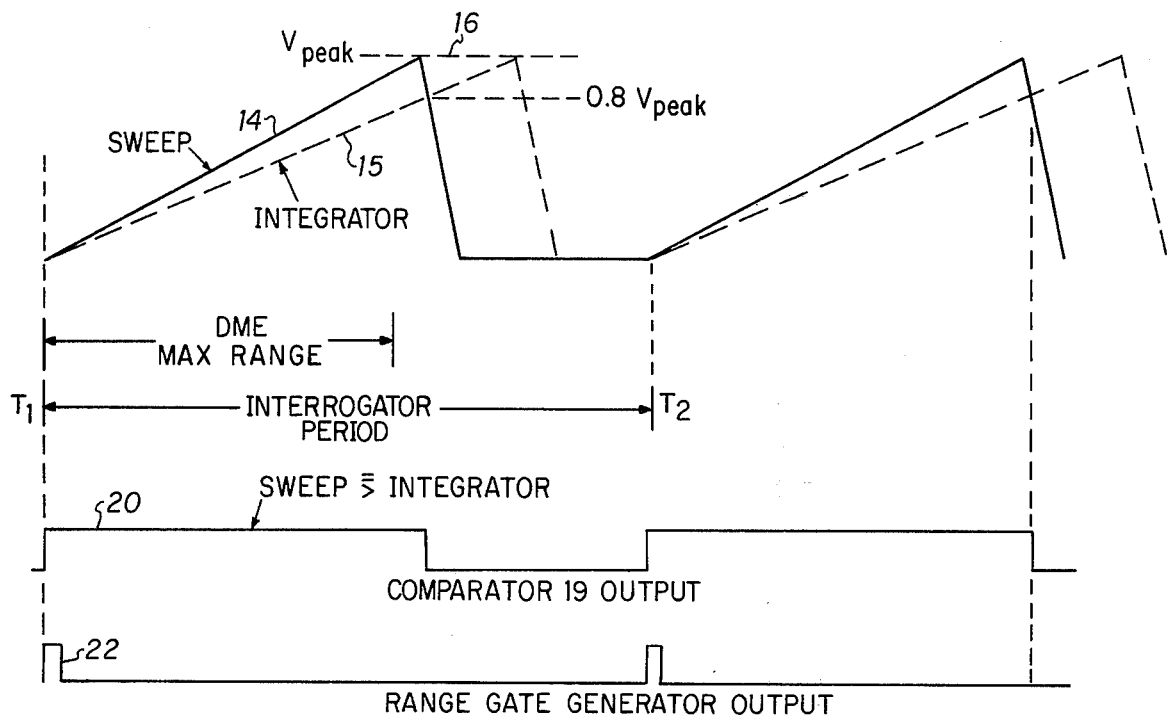
FIG. 2 is a diagrammatic illustration of the basics of range gate generation employed in the emobidiment of FIG. 1.

The key to the operation of the fast search and lock-on circuitry of the present invention resides in the waveforms generated by the sweep generator 12 and the integrator 13. FIG. 2 illustrates key operational waveforms which establish the fast search technique. The sweep waveform 14, as depicted in FIG. 2, is of course basic to the search and lock-on circuitry, and is utilized as the timing standard for the distance measuring circuitry. The sweep waveform is depicted in FIG. 2 as rising linearly from zero at the time occurrence of an interrogation sync pulse of a predetermined peak amplitude 16 as established by $V_{peak}$ at which time the sweep generator is reset to zero. Sweep reset time is slightly in excess of the time defining maximum DME range in the system.

The sweep waveform 14 defines a pre-established millivolt per mile slope which is the basis of the distance measuring analog. Integrator 13 (assuming its associated constant current generator 27 is not inhibited) generates a linearly increasing output waveform rising from an initial zero reset (upon system activation) to a peak reset level. The time between successive interrogation pulses, as represented by time $T_1$ and $T_2$ in FIG. 2, is greater than the time at which integrator reset occurs (assuming the integrator is allowed to rise to its maximum value). The slope of the integrator output waveform 15 is chosen to be less than that of the distance analog slope of the sweep waveform 14. As depicted in FIG. 2, the slope of the integrator output waveform 15 may be 80% that of the sweep output waveform 14. The sweep waveform 14 and integrator output waveform 15 are applied as respective inputs to comparator 19 in the system of FIG. 1. In the basic analysis depicted in FIG. 2, wherein the integrator is assumed to be uninhibited and thus allowed to rise to its maximum value during each interrogation period, an output 20 from comparator 19 is developed during that period of each successive interrogation cycle when the magnitude of the sweep voltage 14 exceeds that of the integrator 15. Thus, in FIG. 2, a comparator output 20 is developed at time $T_1$ and at time $T_2$, with a range gate being initiated at these times.

The integrator output waveform 15, however, upon reply pulses being received, is not allowed to run its full course but rather is inhibited under the control of the relative time occurrence between reply pulses and range gate 22. Assuming then, that during the first interrogation peroid between times $T_1$ and $T_2$ that a reply was received at one-half the DME maximum range and that the integrator was inhibited at this point in time, the integrator would hold a voltage value corresponding to 80% of the sweep voltage distance analog at that instant. During the next subsequent voltage interrogation period, the sweep voltage would again rise from zero and equal the magnitude of the held integrator output of a point in time corresponding to 80% of the voltage analog representing the reply pulse position in the first interrogation period, and at this time comparator 19 would provide an output so as to move the range gate out in time to this 80% distance value. This basic operational sequence is the key to the fast search technique of the present invention which permits the search sequence to ignore that portion of the sweep analog which precedes the point at which a reply was received in the preceding interrogation period, and the subsequent range gate generation occurs in step-like fashion from that point on out in distance. Generally then, integrator 13 builds up to and stores a voltage which corresponds to 80% of the voltage distance analog at which a reply pulse was received in a next preceding interrogation period, and during any next succeeding interrogation period, all reply pulses received prior to this point in time are ignored.

Figure 3:
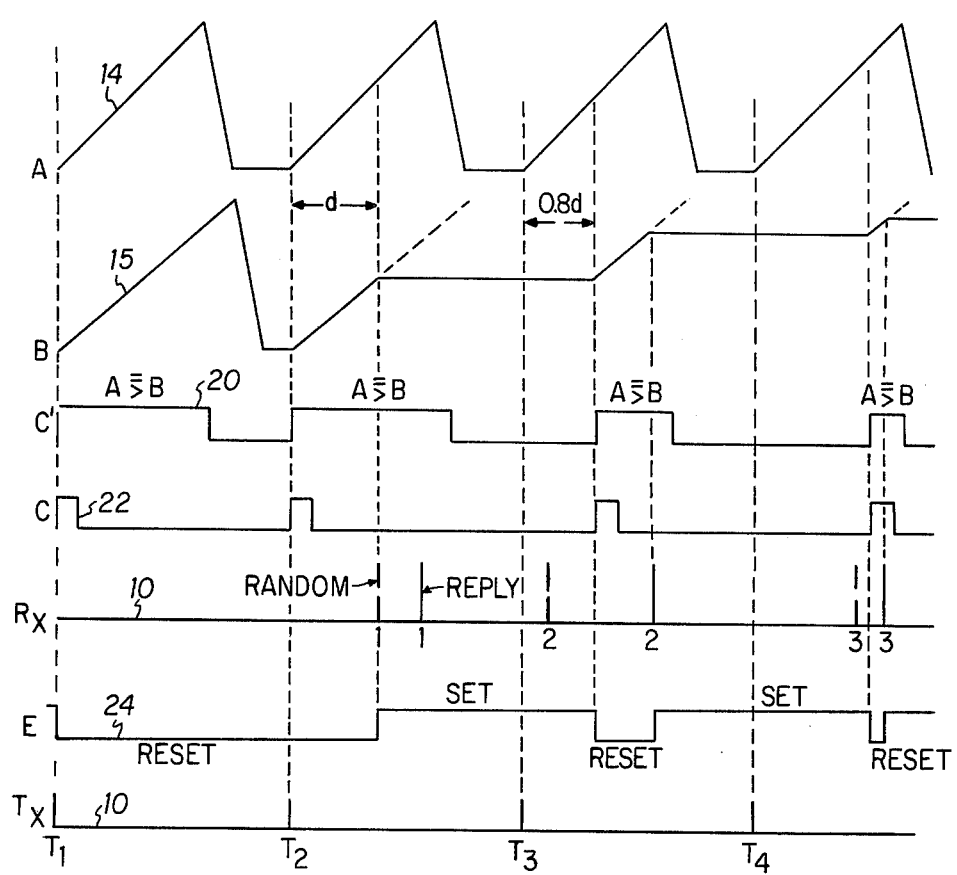
FIG. 3 is a diagrammatic illustration of representative key waveforms definitive of the operation of circuitry of FIG. 1.

Operational waveforms depicted in FIG. 3 represent a search sequence during which the range gate 22 is caused to step out in time from a zero distance position to a position representing the distance of a true reply pulse.

The times $T_1$, $T_2$, $T_3$ and $T_4$ depicted in FIG. 3 represent the time occurrence of successive interrogation sync pulses 10. Sync pulse $T_1$ corresponds in time to system turn-on at which time the sweep waveform A and the integrator waveform B are both zero. The times between successive interrogation sync pulses represent successive interrogation periods. The first interrogation period ($T_1 - T_2$) assumes no reply pulses such that the sweep and integrator output waveforms A and B are allowed to rise their reset value. Waveform C' indicates the output from comparator 19 over that period of the interrogation cycle when waveform A is equal to or in excess of waveform B. Waveform C depicts the generation of a range gate at times $T_1$ and $T_2$ corresponding to the leading edge of the comparator output waveform C'. Waveform $R_X$ depicts an assumed absence of reply pulses during the first interrogation period. Since, with reference to FIG. 1, the output 22 from the range gate generator (waveform C) is applied to the reset terminal of flip-flop 23, flip-flop 23 resets at time $T_1$. Since no reply pulse is assumed to be received in the first interrogation period, the reset condition of flip-flop 23 (waveform E) is retained.

At time $T_2$ a second interrogation period is initiated and the sweep waveform A and integrator output waveform B again rise at their preassigned slopes. Comparator 19 again provides an output at time $T_2$ corresponding to zero range and, in response to the comparator output, a range gate 22 is again generated at time $T_2$. A first received pulse 11 (assumed random as opposed to a true interrogation reply) is depicted during the second interrogation period. In response to random reply pulse 1 (illustrated in dashed line) flip-flop 23 is set to provide a logic output 24 (waveform E) which is applied through OR gate 25 of FIG. 1 to inhibit the constant current generator 27. The integrator output 15 holds at its accumulated voltage level. Reference waveform B illustrates that the integrator output 15 rises until the time occurrence of random reply 1 at which time it is held due to the inhibiting action established by waveform E. The integrator output (waveform B) is thus held at a voltage level corresponding to the distance d on the distance voltage analog established by the sweep waveform A.

A second reply pulse, designated as reply 1, is assumed to occur after the time occurrence of random pulse 1 in the second interrogation period. Since flip-flop 23 was set by the previously received random pulse 1, reply pulse 1 is ignored.

At the time corresponding to the third interrogation pulse $T_3$, the sweep waveform again rises from zero at its pre-established rate while the integrator output waveform B continues to be held at the level reached in the preceding interrogation period. A random pulse 2 is designated in the third interrogation period and, again, since flip-flop 23 is in a set condition, random pulse 2 has no operational effect and is ignored. The sweep waveform A rises until it equals the level of the integrator waveform B, at which time comparator 19 again generates an output waveform to initiate a range gate during the third interrogation period which occurs in time at 80% of the distance at which the first pulse (random 1) was received in the preceding interrogation period. The range gate 22 (waveform C) resets flip-flop 23 to a logic level which removes the previously imposed integrator inhibit, allowing the integrator output 15 to rise from its previously stored value at its preassigned rate until the time occurrence of reply pulse 2. Reply pulse 2 sets flip-flop 23 to again impose the inhibit function and integrator 13 holds its output as depicted in waveform B.

Thus, during the operation sequence as thus far described the circuitry has accomplished the following:

1. Initiated search at zero range during interrogation period 2.
2. Discovered random pulse 1 and ignored it in interrogation period 2.
3. Continued searching starting at 80% of the range represented by random pulse 1.
4. Ignored random pulse 2 (which is assumed to have occurred at less than 80% of the range of random pulse 1).
5. Started the process of lock-on to the reply. The range gate has moved out on the distance analog time scale but is not yet coincident with the reply pulse. During interrogation period 3, the range gate moved out to be located at 80% of the range represented by random pulse 1 in the preceding interrogation period.

In the fourth interrogation period, which initiates at time $T_4$, the previous actions repeat. The interrogation pulse $T_4$ initiates the sweep. Sweep waveform A rises to the stored voltage established by the integrator (waveform B), at which time the range gate is generated. The range gate has closed in on reply pulse 3 during interrogation period 4, the result of the small rise of integrator output voltage during interrogation period 3. Thus, during the four interrogation periods depicted in FIG. 3, the system has caused range gate 22 to step out in time and rapidly acquire a time synchronozed position as regards the reply pulse.

The generation of the range gate during interrogation period 4 again resets flip-flop 23 which, in the absence of further control circuitry, would allow the integrator to continue to rise such that during a subsequent interrogation period the range gate would be caused to move out in time. The integrator output is depicted in waveform B as rising only until the time occurrence of reply pulse 3 at which time flip-flop 23 is set. The next range gate would reset the flip-flop and remove the inhibit. Thus, upon reply pulse 3 being time synchronous with the range gate, further means of maintaining integrator inhibit must be imposed while reply pulse 3 is investigated over a predetermined number of interrogation periods to ascertain whether, in fact, the reply pulse is a true interrogation return. The inhibit control as concerns the integrator is, upon a reply pulse (either random or true) being time synchronous with the range gate, provided by the lock-on criterion logic circuitry depicted in FIG. 1 which, in response to any range gate synchronous reply pulse, provides an inhibiting logic output to OR gate 25 over a predetermined number of investigative interrogation cycles during which the range gate time synchronous reply pulse is established either as a true reply or a random pulse.

In the operational analysis exampled by the waveforms of FIG. 3 assumption was made that the first reply pulse to become time synchronous with the range gate was a true reply as opposed to a random reply. Obviously, a true reply pulse would bear a fixed time relationship with the sweep waveform A (and thus the range gate C), whereas a random reply would bear no fixed or repeatable time relationship with the range gate.

The lock-on criterion logic circuitry serves to initiate a lock-on process upon the range gate and the reply pulse becoming time coincident, by applying a predetermined criterion to identify true reply pulses as opposed to random pulses. Numerous criterion useful for this purpose have been implemented in the art. Generally, a predetermined ratio of range gate synchronous replies to interrogations defines this criterion. For this investigation, the range gate must be rendered essentially stationary, that is, the search sequence must be stopped to "look" for reappearance of a reply pulse within the range gate over a predetermined number of interrogation periods as established by a particular criterion.

For purposes of the present invention, the lock-on criterion logic circuitry might comprise any number of logic circuit implementations, to perform the following functions:

1. Upon a reply pulse being synchronous with the range gate, provide an inhibiting output to OR gate 25 over a predetermined number of interrogation cycles sufficient to establish a particular criterion.

2. Continue to apply an inhibiting output to OR gate 25 upon a particular criterion being met.

3. Terminate the inhibiting logic output when an established criterion is no longer met, and allow the system to revert back to search operational mode.

A lock-on criterion test applied over fifteen consecutive interrogation periods is depicted functionally in FIG. 1. A reply pulse is assumed to be properly verified if no misses (reply pulse not coincident with range gate) are observed in any four consecutive interrogation periods. The output 22 of range gate generator 21 and the reply pulses 11 are applied to an AND gate 29. The output 30 from AND gate 29 comprises only range gate synchronous reply pulses. The circuitry employs a two-bit counter 31 to which the range gate synchronous reply pulses on line 30 are applied as a zero reset input. The range gate synchronous reply pulses 30 are also applied to appropriate count control logic circuitry 32 which is responsive to the count accumulated in counter 31 to gate range gates 22 as inputs to the counter 31 upon a time synchronous reply pulse being received and to provide a logic output 37 consisting of a positive voltage step (providing integrator inhibit) so long as the reply pulse falls within the range gate at least once in four successive interrogation periods. This same positive voltage step 37 is applied to an RC time constant network 33 which provides a first input 34 to a comparator 36. A second input 35 to comparator 36 comprises a predetermined voltage threshold. The time constant of the RC network 33 requires 15 interrogation periods for the output 34 from the RC network to build up to the level of the predetermined threshold input 35, whereupon comparator 36 develops an output 38 comprised of a positive voltage step signifying that the criterion has been met.

The first coincidence of a reply pulse and the range gate resets counter 31 such that the counter $\overline{Q}_2$ output is of positive logic. If the counter is successively reset to zero after it counts each successive range gate, the $\overline{Q}_2$ output logic continues to be positive. Appropriate logic circuitry 32 may be made responsive to the exampled $\overline{Q}_2$ output from counter 31 such that, if during any fifteen successive interrogation periods the counter is not reset each time but counts successively four times without reset, the counter resets itself and the $\overline{Q}_2$ output goes to logic zero to remove the positive step. The threshold of the comparator 36 cannot be exceeded and lock-on is not attained. This event represents the circuit's discrimination against random receive pulses.

The same result is obtained if the counter 31 is reset only once each fourth interrogation period. The lock-on circuitry is thus tolerant to a ground station reply efficiency as low as 25%; that is, reply to interrogation at once each four interrogations, since assuming a ground station's reply efficiency of at least 25%, four successive misses in fifteen successive interrogation periods cannot occur.

Once the lock-on criterion has been met, the output from comparator 36 provides a holding inhibit for integrator 13 and the logic level of output 38 from the comparator 36 may be utilized to initiate an operational mode change from search to track in the DME system.

To reiterate, the lock-on criterion circuitry responds to a range gate synchronous reply pulse to provide an inhibiting logic output for the integrator over a period of time in which an established criterion ratio is investigated, and provides a continuing inhibiting output once this criterion is met and held. Conversely, the lock-on circuitry will not retain the inhibiting output function should the threshold of comparator 36 fail to be exceeded, and the system will be allowed to continue searching out for the next range gate time synchronous reply pulse.

Figure 4:
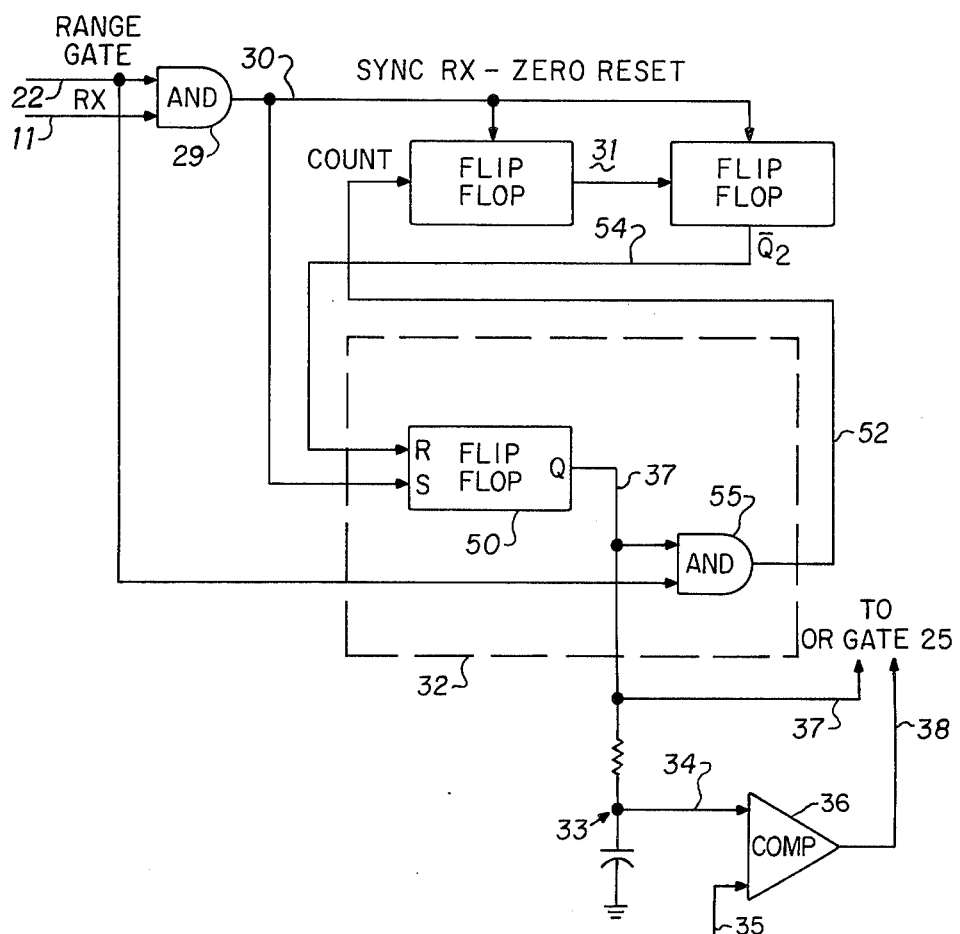
FIG. 4 is a functional diagram of a type of lock-on criterion logic circuitry which might be employed in the embodiment of FIG. 1.

FIG. 4 illustrates a more detailed functional diagram of the criterion circuitry generally depicted in FIG. 1. With reference to FIG. 4, the range gate synchronous reply pulses provided a zero reset for two-stage (two bit) binary counter 31 as well as a setting input for a set/reset flip-flop 50, the latter being implemented as part of the count control logic circuitry block 32 of FIG. 1. Range gates 22 and the Q output 37 from flip-flop 50 are applied as respective inputs to an AND gate 55 the output 52 of which is applied as a count input to counter 31. The $\overline{Q}_2$ output from counter 31 is applied as a reset input 54 to flip-flop 50. The Q output from reset flip-flop 50 comprises the output 37 from count control logic circuitry 32 which is applied to OR gate 25 as an integrator inhibit control as well as to the RC network 33.

Figure 5:
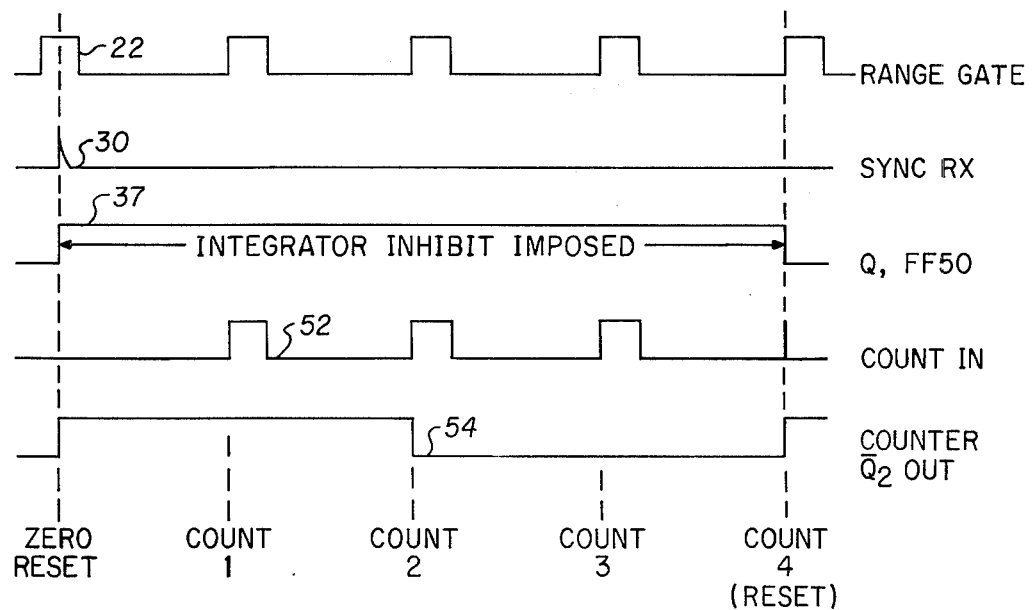
FIG. 5 illustrates operational waveforms related to the criterion circuitry of FIG. 4.

Reference is made to the operational waveforms of FIG. 5. The first range gate synchronous reply pulse 30 in an interrogation period sets flip-flop 50 to a positive Q output logic level. Succeeding ones of the range gates 22 are gated as input 52 to the counter, the counter having been previously reset by the range gate synchronous reply 30. The $\overline{Q}_2$ output 54 from flip-flop 31 is illustrated throughout a full four-count sequence (assuming no intervening reset). It is seen that the $\overline{Q}_2$ output 54 rises to a positive voltage level upon a fourth count being effected without intervening reset. Since this $\overline{Q}_2$ output 54 resets positive-edge-triggered flip-flop 50, the Q output from flip-flop 50 is seen to comprise a positive step which is held until the counter counts four successive range gates without intervening reset.

Obviously, should the counter 31 be reset by a range gate synchronous reply pulse before four range gates are applied to the counter, the $Q_2$ output from the counter is maintained at a positive logic level so as to continue to enable the inhibit provided by the Q output 37 from flip-flop 50. Flip-flop 50, thus provides an output 37 which maintains an inhibit logic through OR gate 25 so long as counter 31 is not allowed to go through its full count.

The exampled criterion logic circuitry is thus seen to provide the necessary function of establishing, in response to a range gate synchronous reply pulse, an integrator inhibiting logic through OR gate 25 to maintain this inhibiting logic through a predetermined number of counts sufficient to make a validity determination and to provide, once the criterion is met, sustained inhibiting output. Should the reply pulses fail to meet the exampled criterion, the logic output switches to a logic level which permits the integrator to again build up, causing the range gate to move out in time on the sweep analog scale to continue searching for a next received reply pulse.

It is seen that the described fast search and lock-on circuitry permits the range gate to move out rapidly in discrete steps and to search during successive interrogation periods only in an area where reply pulses are expected to occur. Since the portion of the sweep during which reply pulses were not encountered during a previous interrogation period is not reinvestigated during an instant interrogation period, a substantial reduction in search and reply pulse acquisition time is realized.

Although the present invention has been described with respect to a particular embodiment, it is not to be so limited that changes might be made therein which fall within the scope of the invention defined in the appended claims.

I claim:

1. In an electronic ranging system, means for generating a range gate in time synchronism with replies to successive transmitted pulses, comprising voltage sweep generating means responsive to the time occurrence of an initial and subsequent ones of said transmitted pulses to generate a sweep output waveform having a predetermined slope, reference voltage generating means responsive to an initial transmitted pulse to generate a reference output waveform having a slope less than that of said sweep generator output waveform, range gate generating means responsive to the relative magnitudes of said reference and sweep generating means to generate said range gate, means responsive to successive ones of said range gates to enable said reference voltage generating means, and means responsive to the first reply pulse received after the generation of successive ones of said range gates to disable said reference voltage generating means 2. Means as defined in claim 1 comprising reset means from said sweep generating means and said reference voltage generating means whereby the respective outputs therefrom are reset to zero upon rising to a predetermined maximum voltage level.

3. Means as defined in claim 2 comprising voltage comparison means receiving the outputs of said sweep generating means and said reference voltage generating means and producing an output signal when the magnitude of said sweep output exceeds that of said reference voltage generating means output, and said range gate generating means being responsive to the initiation of said comparator output signal to generate a range gate of predetermined time duration.

4. Means as defined in claim 1 wherein said reference voltage generating means comprises a signal integrator, a predetermined constant input signal source supplying an input to said integrator, and said input signal source being selectively enabled and disabled by said range gate generation responsive means and said first reply pulse responsive means.

5. Meas as defined in claim 4 wherein said integrator input signal source comprises a constant current generator, said constant current generator when enabled applying a predetermined input current to said integrator, said constant current generator when disabled applying zero input current to said integrator.

6. Means as defined in claim 5 wherein said selective integrator enablement and disablement means comprises logic means responsive to said range gate generation and said first reply pulse reception to selectively enable and disable said constant current generator.

7. Means as defined in claim 6 wherein said logic means comprises logic level voltage generation means, said logic level voltage generation means receiving said reply pulses and range gate as respective inputs thereto and being responsive to the first reply pulse received after each said transmitted pulse to provide a first logic level output and responsive to successive ones of said range gates to provide a second logic voltage output level, the output from said logic level voltage generation means being applied as a selective inhibit input to said constant current generator.

8. Means as defined in claim 7 wherein said logic means comprises a set/reset flip-flop, said received reply pulses and range gates being applied to an individual one of the reset and set input terminals of said flip-flop, and one of said Q and Q outputs from said flip-flop comprising said selective inhibit input to said constant current generator.

9. Means as defined in claim 8 further including lock-on criterion logic circuitry, said reply pulses and range gates being applied as inputs to said lock-on criterion logic circuitry, said lock-on criterion logic circuitry comprising logic circuit means repsonsive to a range gate time synchronous one of said receive pulses to initiate and maintain an output logic level over a period of time defined by a predetermined number of succeeding transmitted pulses, and means applying the output of said logic circuit means as a further selectively disabling input to said signal integrating means.

10. Means as defined in claim 9 further including means responsive to a predetermined ratio of range gate synchronous replies to successive pulse transmissions to provide a further sustained logic level output, and means applying said sustained logic level output as a still further selectively disabling input to said signal integrating means.

* * * * *

UNITED STATES PATENT OFFICE
CERTIFICATE OF CORRECTION

Patent No. 3,936,823     Dated February 3, 1976

Inventor(s) Charles A. Weber

It is certified that error appears in the above-identified patent and that said Letters Patent are hereby corrected as shown below:

IN THE SPECIFICATION:

Column 4, line 66, delete "occurrence" and substitute therefor --occurrences--.

Column 5, line 64, after "logic", insert --level--.

IN THE CLAIMS:

Column 10, line 9, delete "from" and substitute therefor --for--.

Column 10, line 43, delete "gate" and substitute therefor --gates--.

Column 10, line 55, delete "Q" and substitute therefor --$\overline{Q}$--, (second occurrence).

Signed and Sealed this twenty-ninth Day of June 1976

[SEAL]

Attest:

RUTH C. MASON
Attesting Officer

C. MARSHALL DANN
Commissioner of Patents and Trademarks